United States Patent

[11] 3,543,939

| [72] | Inventor | Raymond R. Dupler |
| | | Toledo, Ohio |
| [21] | Appl. No. | 761,107 |
| [22] | Filed | Sept. 20, 1968 |
| [45] | Patented | Dec. 1, 1970 |
| [73] | Assignee | Sun Oil Company |
| | | Philadelphia, Pennsylvania |
| | | a corporation of New Jersey |

[54] FLUID FEED ARRANGEMENT
5 Claims, 8 Drawing Figs.
[52] U.S. Cl. .................................................. 210/273
[51] Int. Cl. ..................................................... B01d 29/38
[50] Field of Search ........................................... 210/80,
269, 271—273, 279, 287

[56] References Cited
UNITED STATES PATENTS

| 943,708 | 12/1909 | Roake | 210/273 |
| 2,296,824 | 9/1942 | Ashworth | 210/273X |
| 2,351,835 | 6/1944 | Pick | 210/273 |
| 2,439,764 | 4/1948 | Walker | 210/269X |
| 3,292,788 | 12/1966 | Schwarz | 210/80 |
| 454,817 | 6/1891 | Warren | 210/273 |

*Primary Examiner*—Samih N. Zaharna
*Attorneys*—George L. Church, Donald R. Johnson, Wilmer E. Mc Corquodale, Jr. and Frank A. Rechif ABSTRACT: In a water softener tank containing a bed of ion exchange resin, fluids such as water to be treated are fed into the tank through a rotating feed pipe which carries at its inner end a (rotating) distributor head with nozzles through which the fluids flow out onto the bed. The distributor head is adjustable vertically with respect to the bed, and the discharge angle of the nozzles with respect to the bed is also adjustable.

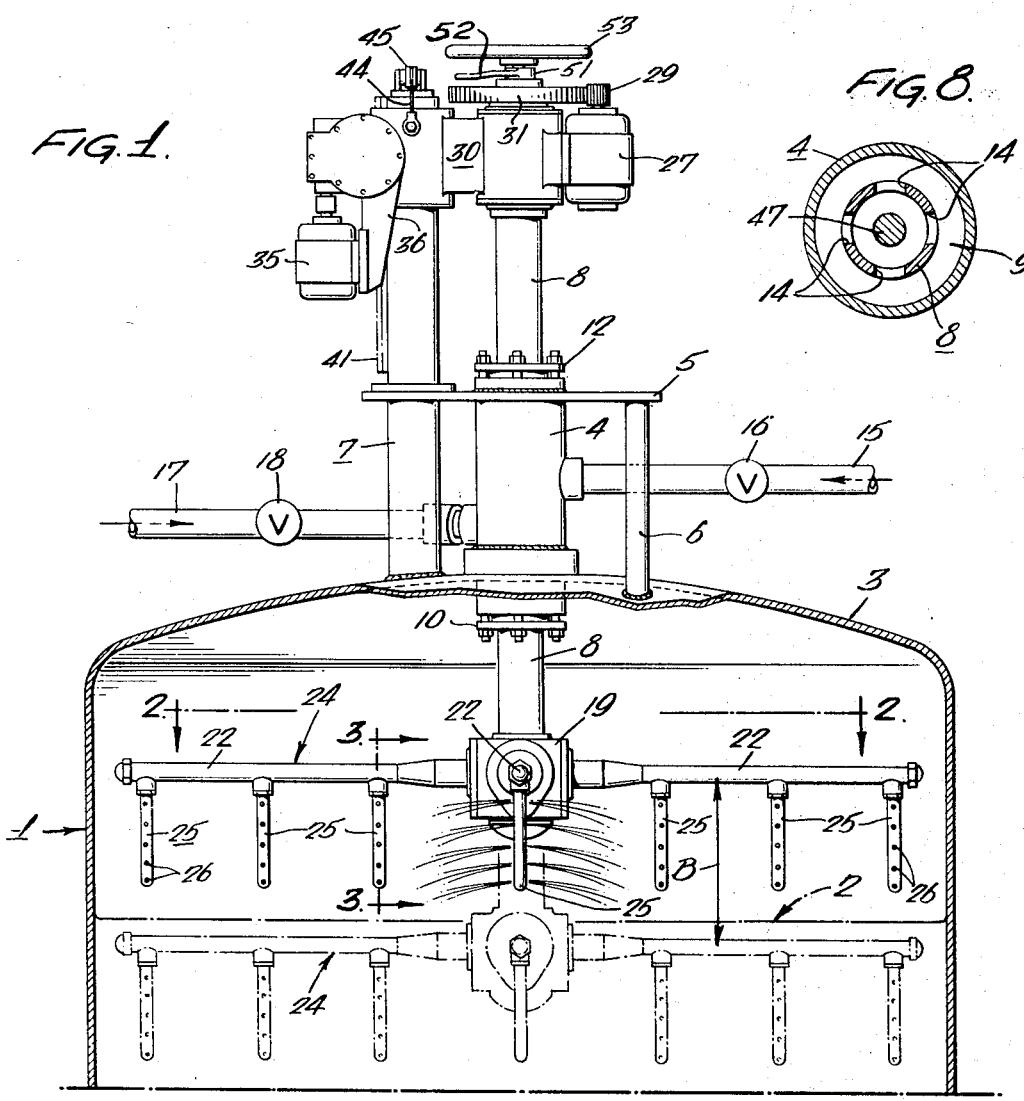
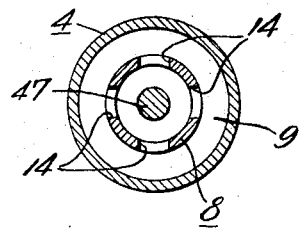
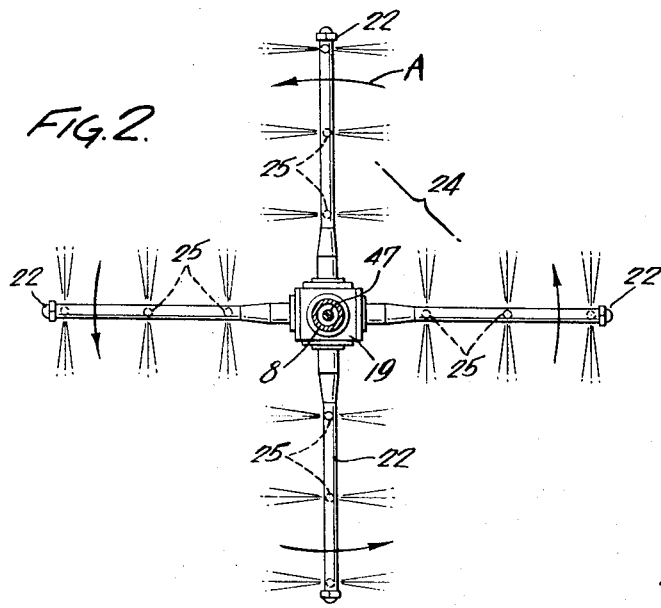
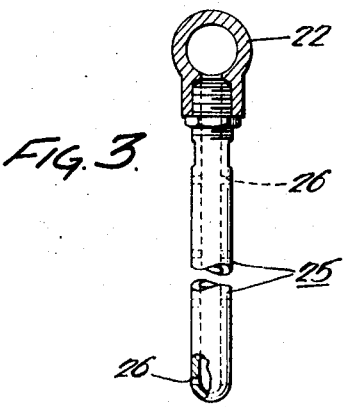
Inventor:
Raymond R. Dupler
by Donald R. Johnson Atty

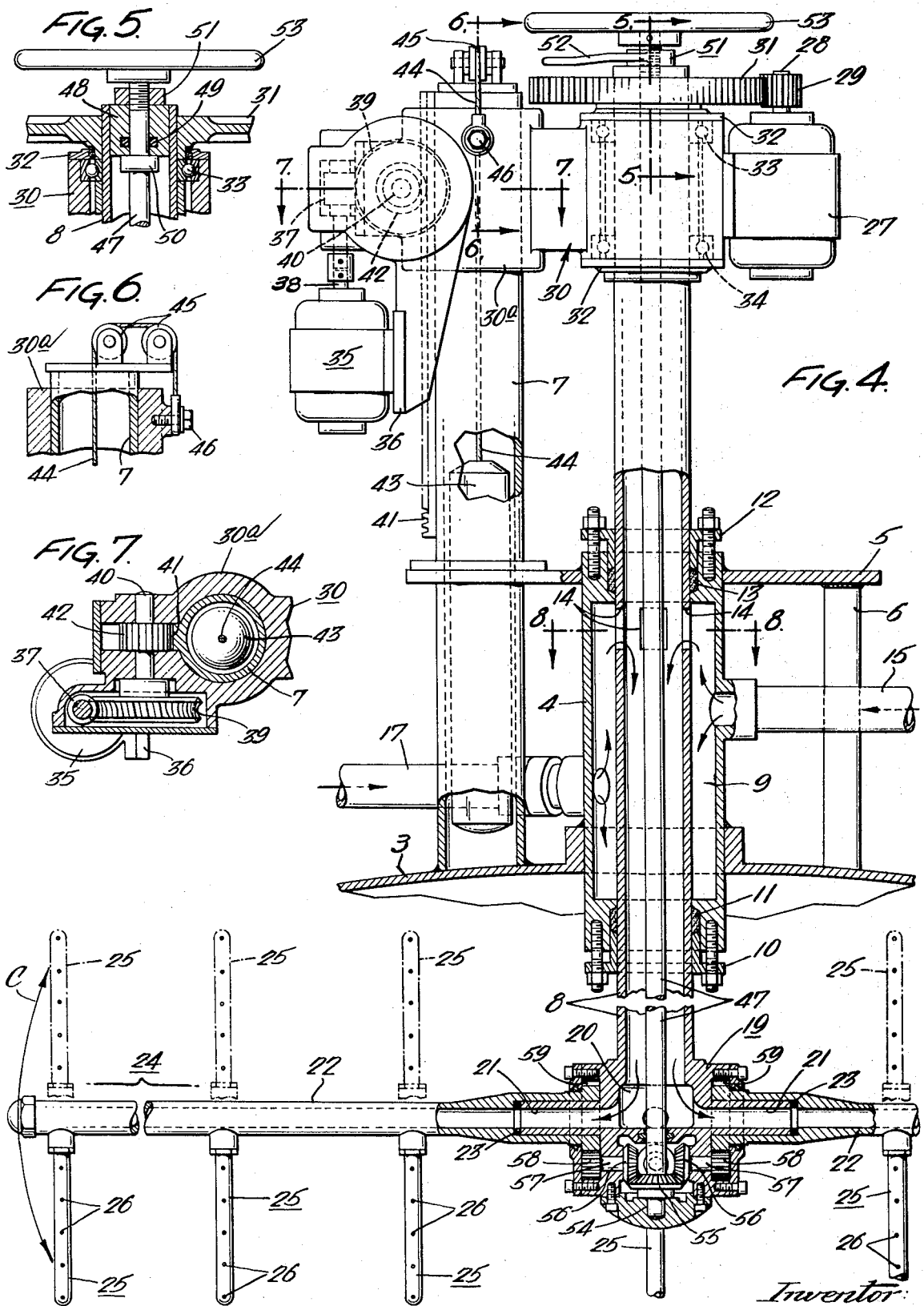

FLUID FEED ARRANGEMENT

This invention relates to a fluid feed arrangement, and more particularly to an arrangement for feeding fluids into a tank containing a solid material, for treatment of such fluids in the tank. As an example, the arrangement of the invention has particular utility in a water softener, wherein the "hard" water to be treated is fed into a tank containing a bed of a granular ion exchange resin, for treatment (i.e. "softening") of the water by the granular material.

It is important, for optimum utilization of the ion exchange resin in water softeners of the aforementioned type, that the various fluids 25 (both the untreated water and the brine, the latter of which is used periodically for regeneration of the granular material) be distributed as uniformly as possible through the entire volume of the resin bed. If this is done, channeling of the fluids through the bed is avoided.

An object of this invention is to provide a novel fluid feed arrangement for fluid treatment devices such as water softeners and the like.

Another object is to provide a fluid feed arrangement for water softeners which effects a substantially uniform distribution of the fluids fed into the softener, over the bed of ion exchange resin in the softener.

The objects of this invention are accomplished, briefly, in the following manner: A vertically-disposed water softener tank, which contains a quantity of a granular ion exchange resin, is provided with a vertical fluid feed pipe which extends rotatably through the top wall of the tank into juxtaposition with the bed of solid material. A horizontally-extending tubular distributor head, having therein a plurality of ports which provide fluid passages between the head and the interior of the tank, is secured to the lower end of the pipe and in fluid communication therewith. Means is provided for rotating the feed pipe about its axis, and other means is provided for supplying feed to the feed pipe. Means is provided for moving the pipe vertically, to adjust the position of the head within the tank. Other means is provided for rotating the distributor head about its axis.

A detailed description of the invention follows, taken in conjunction with the accompanying drawings, wherein:

FIG. 1 is an elevational view, partly in section, of the upper end of a water softener tank according to the invention, illustrating two different vertical positions of the distributor head arrangement inside the tank;

FIG. 2 is a sectional view taken along line 2-2 of FIG. 1;

FIG. 3 is a sectional view through one of the discharge nozzles or port assemblies, taken along line 3-3 of FIG. 1;

FIG. 4 is a fragmentary view generally similar to FIG. 1, but drawn on an enlarged scale and illustrating two different positions of the distributor head;

FIG. 5 is a fragmentary vertical sectional view of a detail, taken along line 5-5 of FIG. 4;

FIG. 6 is a fragmentary vertical sectional view of a detail, taken along line 6-6 of FIG. 4;

FIG. 7 is a fragmentary horizontal sectional view of a detail, taken along line 7-7 of FIG. 4; and FIG. 8 is a fragmentary horizontal sectional view of a detail, taken along line 8-8 of FIG. 4.

Referring now to the drawings, an elongated vertically-disposed (i.e., with its longitudinal axis extending vertically) tank 1 of a water softener contains a quantity of a granular ion exchange resin 2, which is arranged as a bed in tank 1; the material 2 operates in a well-known manner to "soften" the "hard" water fed into the tank 1. Tank 1 has a conventional domed top wall 3.

An outer metallic sleeve 4 is sealed vertically through the tank top wall 3, centrally thereof, the lower portion of this sleeve being rigidly secured as by welding to the wall 3. At its upper end, outside the tank, sleeve 4 is welded into and through a disklike apertured plate 5 which is in turn mounted in a fixed position above wall 3 by means of a pair of spaced rigid posts 6 whose upper ends are welded to the lower face of plate 5 and whose lower ends are welded to the upper (outside) face of wall 3, and also by means of a rigid tube 7 whose lower end is welded to the upper face of wall 3 and which is welded into and through the plate 5; tube 7 will be referred to further hereinafter.

The fixed sleeve 4 serves as a bearing and guide for a rotatable feed pipe 8 which is positioned concentrically within sleeve 4. The diameter of pipe 8 is less than that of sleeve 4; the annular region between sleeve 4 and pipe 8 constitutes a chamber 9. To prevent leakage of fluid from the lower end of chamber 9 (outside of pipe 8) into the interior of tank 1, a lower sealing arrangement is provided around the outside of pipe 8, at the lower end of sleeve 4 (within tank 1). A conventional packing gland follower 10 is bolted to the lower end of sleeve 4 and urges a suitable packing material 11 into engagement with the outside of pipe 8, against an opposing backing flange provided in sleeve 4. A similar sealing arrangement is provided at the upper end of sleeve 4 (above or outside of tank 1). This latter or upper arrangement comprises a conventional packing gland follower 12 bolted to the upper end of sleeve 4 and urging a packing 13 into engagement with the outside of pipe 8, against an opposing backing flange provided in sleeve 4.

Chamber 9 communicates with the bore of pipe 8 by means of a plurality (four in number, see FIG. 8) of equiangularly-spaced elongated slots 14 which are substantially rectangular in outer configuration and which are cut through the wall of pipe 8, between the upper and lower sealing arrangements.

A pair of valved pipes are utilized for supplying fluid to the feed pipe 8, by way of chamber 9 and slots 14. A pipe 15 having a shutoff valve 16 therein is coupled at its inner end to chamber 9, near the upper end thereof; this end of pipe 15 is sealed through the wall of sleeve 4. Pipe 15 is utilized for supplying charge ("hard" water) to tank 1, and as an outlet pipe during the "backwash" cycle. A pipe 17 having a shutoff valve 18 therein is coupled at its inner end to chamber 9, below pipe 15; this end of pipe 17 is sealed through the wall of sleeve 4. Pipe 17 is utilized for supplying brine to tank 1, for "regeneration" of the resin 2. A connection (not shown) in the bottom of tank 1 is used as a spent brine outlet, during the regeneration cycle; another bottom connection (also not shown) is used as an outlet for the treated or "soft" water, during the "active" cycle. It is pointed out that only one of the valves 16 and 18 is open at a time; these valves are never both open at the same time.

An integral chambered housing 19 is provided at the lower end of pipe 8, the lower end of the bore of pipe 8 opening into a chamber 20 within housing 19. The inner ends of four orthogonally related integral tubular arms 21, which are arranged in a common horizontal plane (and only two of which can be seen in FIG. 4), open into the chamber 20, and on the outer end of each tubular arm 21 is rotatably mounted a respective distributor tube 22, in such a way that the bore of each respective tube 22 forms an outward continuation of the bore of the corresponding tubular arm 21. The radially inner end portion of each respective tube 22 rotatably surrounds the radially outer end portion of the corresponding tubular arm 21. The tubes 22, together with the arms 21, form a horizontally-extending tubular distributor head denoted generally by numeral 24, which head is of cruciform shape seen in plan (as in FIG. 2), and which is in fluid communication with pipe 8, by way of chamber 20. O-rings 23 are utilized to seal the (rotatable) joint between each tubular arm 21 and its corresponding tube 22. The means which enables the tubes 22 to be rotated with respect to the arms 21 will be described hereinafter. Since tubes 22 are mounted on arms 21 as described, the tubes are rotated along with the arms in a horizontal plane, about the vertical axis of pipe 8 (as the latter is rotated by a means hereinafter described).

Distributor head 24 has therein a plurality of horizontally-spaced port assemblies which provide fluid passages or ports between such head and the interior of tank 1. The several port assemblies are spaced at intervals along each of the four tubes 22, and each port assembly comprises a piece of tubing 25 (see FIG. 3) whose inner end is threaded into the wall of a corresponding distributor tube 22, into communication with the bore of the respective tube 22; the axes of tubing pieces 25 are at 90° to the axes of the tubes 22. Each of the tubing pieces 25 has distributed along its length a plurality of apertures 26 which extend through the tube wall, to provide fluid communication between the bore of the respective tubing piece 25 and the interior of tank 1. Each of the tubing pieces 25 is illustrated in FIG. 1 as extending downwardly from the respective distributor tube 22 toward the bed 2 of granular material; however, it is here pointed out (and as will be described further hereinafter) that these tubing pieces 25 may extend in any desired direction from the distributor tubes 22, even to vertically upward therefrom (see FIG. 4). The means for adjusting the direction of these tubing pieces 25 will be described hereinafter. It may be noted here that the port assemblies described (including tubing pieces 25 and apertures 26) provide fluid passages between the distributor head 24 and the interior of tank 1. Due to the threaded connection of tubing pieces 25 to the distributor tubes 22, the former can easily be replaced, when necessary.

When valve 16 is open, fluid flows through pipe 15 into the chamber 9, and thence through the slots 14 into feed pipe 8, and thence downwardly through this pipe into chamber 20, then through respective arms 21 into the respective horizontal distributor tubes 22 of distributor head 24; the fluid flows horizontally outwardly through these latter tubes and through the tubing pieces 25 and apertures 26 onto bed 2 in tank 1. The flow outwardly through apertures 26 is indicated schematically in FIG. 2. Thus, the distributor head 24 distributes the fluid onto the bed 2 by way of the spaced apertures 26.

Above the upper sealing arrangement 12, 13, there is provided a variable speed driving means for rotating the pipe 8 about its (vertical) axis at a low rate, such as one revolution per hour. (As previously stated, distributor head 24 will rotate with pipe 8 about this same vertical axis, in a horizontal plane. This is indicated by arrow A in FIG. 2.) A variable speed electric motor 27, having a vertically-extending output shaft 28 on which is secured a small diameter driving gear 29, is fixedly mounted on a crosshead-type type mounting bracket denoted generally by numeral 30. Gear 29 engages and drives a larger diameter spur gear (ring gear) 31 which is keyed or otherwise suitably secured to the upper end of pipe 8. When motor 27 is suitably energized, the pipe 8 is rotated around its (vertical) axis by means of the gearing 29, 31, at the desired rate.

The cruciform distributor head 24 is rotated at a slow but definite rate of speed by motor 27, through the pipe 8 which rotates within the upper and lower sealing arrangements provided on sleeve 4. During operation of the fluid feed arrangement of this invention, fluid is flowing through pipe 8 and distributor head 24, onto the solid bed 2. The rotating, cruciform distributor head 24 provides an optimum, substantially uniform distribution of the fluid over the solid bed 2.

By means of suitable retaining members 32 located at the upper and lower ends of bracket 30, this bracket is coupled to pipe 8 in such a manner as to prevent any relative vertical movement between the pipe and the bracket, while yet allowing rotation about a vertical axis of pipe 8, by means of gear 31. The bracket 30 carries a bearing arrangement which rotatably journals the upper end of pipe 8. Race-type upper and lower ball bearings 33 and 34, respectively, are utilized, the inner races of these bearings being secured to pipe 8 and the outer races thereof being secured to bracket 30. In this connection, it may be noted that the bracket 30 has a hollow cylindrical portion which surrounds pipe 8.

Under certain conditions, it may be necessary to adjust the distributor head 24 vertically, so that it will be located a certain predetermined distance above the resin bed 2. Also, at certain times the distributor head should be lowered so that it just touches the top of the bed 2, in order to level the same and to lift out foreign matter; this is particularly desirable during the "backwash" cycle. Therefore, the pipe 8 should be vertically movable through a certain distance (the maximum permissible distance, of course, would be just a little less than the vertical height of chamber 9, so that slots 14 would be in communication with chamber 9, at all times), so that the vertical position of the distributor head 24 can be adjusted with respect to the tank 1. A means for adjusting the distributor head vertically, from outside the tank, will now be described.

At the end of bracket 30 opposite motor 27, this bracket has a hollow cylindrical portion 30a which slidably surrounds tube 7. A reversible electric motor 35 is fixedly secured to bracket portion 30a, by means of an arm 36 which extends outwardly and downwardly from this bracket portion. A worm gear 37 is fixed on the vertically-extending output shaft 38 of motor 35, this worm meshing with and driving a worm wheel 39 fixed on a horizontally-extending stub shaft 40 which is rotatably mounted in bracket 30. A rack 41 having gear teeth thereon is rigidly secured to the upper portion of fixed tube 7 (above plate 5) at one side thereof, this rack extending vertically. A pinion 42, keyed on shaft 40, meshes with the fixed rack 41.

When motor 35 is energized, the pinion 42 is rotated through the gearing 37, 39, and this pinion meshes with the stationary rack 41 to drive the bracket 30 (as well as all the items secured thereto, including pipe 8, as well as motor 27, gears 29 and 31, motor 35, etc.) in the vertical direction. Distributor head 24, being secured to the lower end of pipe 8, moves vertically along with the latter. In FIG. 1, the distributor head is illustrated in its uppermost position in solid lines, and it is illustrated in a lower position (resulting from the energization of motor 35, as above described) in phantom lines. The movement between these two positions is indicated by the directional line B.

A counterbalance or counterweight 43, for the above-described vertical movement of pipe 8, distributor head 24, the motors 27 and 35, etc., is arranged to move vertically within tube 7. The upper end of this counterweight is attached to one end of a flexible connecter 44 (for example, a wire cable) which extends upwardly tube 7 and over a pair of pulleys 45 journaled for rotation on the upper end of tube 7. From the pulleys 45, the cable extends downwardly, the other end of the cable being secured as by a bolt 46 to the bracket portion 30a. It should be apparent that the counterweight 43 acts to decrease the power required of the vertical driving motor 35.

Means is also provided for adjusting the discharge angle of the nozzle apertures 26 with respect to the bed 2. This is done by adjusting the angularity (with respect to a vertical radius, for example) the tubing pieces 25 (each in a respective vertical plane), by rotating the four distributor tubes 22 each about its own longitudinal (horizontal) axis.

A solid shaft 47 is mounted concentrically within pipe 8. The upper end of this shaft passes rotatably through the central hole in a cylindrical plug 48 which is sealed into the upper end of pipe 8. An O-ring seal 49 is used around shaft 47, to prevent the leakage of fluid outwardly around this shaft. An integral collar 50 near the upper end of shaft 47 is arranged to come into contact with the lower face of plug 48, while a nut 51 having an operating lever 52 secured thereto threadedly engages the upper threaded end of shaft 47 and is adapted to come into contact with the upper face of plug 48. When nut 51 is loosened on shaft 47 by means of lever 52, shaft 47 is unlocked and is free to rotate with respect to pipe 8, since the loosening of this nut permits collar 50 to move away from plug 48; however, when nut 51 is tightened, the collar 50 is brought up snugly against the lower face of plug 48 while the nut is tightened against the upper face of this plug, causing the shaft 47 to be tightly secured or locked to pipe 8 and preventing any rotation of the shaft relative to this pipe. A handwheel 53 is fixedly secured to the upper end of shaft 47, for enabling manual rotation of the latter when desired.

During normal operation of the water softener (i.e., when the pipe 8 is being rotated about its own vertical, longitudinal axis); the shaft 47 is locked to pipe 8, so that elements 47 and 49—53 all rotate along with pipe 8. Also, when the distributor head 24 is adjusted vertically by means of motor 35, etc., elements 47 and 49—53 all move vertically as a unit, along with pipe 8. (This latter assumes that shaft 47 is locked to pipe 8, which is the normal situation.)

The plug 48 provides a bearing for the upper end of shaft 47, when this shaft is rotated with respect to pipe 8. The shaft 47 extends downwardly within pipe 8 to below the chamber 20, and the lower end 54 of this shaft is journaled in a cap secured to the bottom end of housing 19.

A driving bevel gear 55 is keyed or otherwise fixedly secured to shaft 47, near its lower end. Four driven bevel gears 56 (only three of which are visible in FIG. 4), spaced 90° apart around gear 55, are positioned in mesh with gear 55. Each of the gears 56 is fixed to one end of a respective horizontally-extending stub shaft 57, the four stub shafts 57 being mounted for rotation in housing 19. The opposite end of each of the four stub shafts 57 has fixed thereto a respective spur gear 58, and each of these spur gears meshes with a respective ring gear 59 which is fixed to the inner end of a corresponding one of the distributor tubes 22 (which latter carry the port assemblies 25, 26, as previously described). As previously noted, the four distributor tubes 22 are mounted for rotation about the respective tubular arms 21 (which latter are integral with the housing 19).

Assuming that shaft 47 has been unlocked from pipe 8 and is therefore free to rotate with respect to this latter pipe, when shaft 47 is rotated by means of its handwheel 53, gear 55 will rotate, and this will by means of the gears 56 cause rotation of stub shafts 57, each about its own horizontal axis. Then, through the gearing 58, 59, each of the four distributor tubes 22 will be rotated about its own longitudinal (horizontal) axis. This will cause the tubing pieces 25 (secured to tubes 22), with the nozzle apertures 26, to be adjusted angularly with respect to the bed 2. In FIG. 4, two positions (180° apart) of the tubing pieces 25 are illustrated, one position in solid lines and one position in phantom lines. The movement between these two positions is indicated by the directional line C.

During normal operation of the water softener (pipe 8 being rotated about its own vertical, longitudinal axis, and shaft 47 being locked to this pipe), the gearing arrangement 55—59 rotates as a unit about the vertical axis of pipe 8, and there is then no relative movement between gears 55 and 56. Consequently, the tubing pieces remain at the angularity (with respect to the bed 2) to which they were previously adjusted. When the distributor head 24 is adjusted vertically, elements 54—59 all move vertically as a unit, along with pipe 8 (assuming shaft 47 is then locked to pipe 8, which is the normal case).

I claim:

1. In a water softener, a vertically-elongated tank adapted to contain a quantity of a granular ion exchange resin, a vertical feed pipe extending rotatably through the top wall of said tank and terminating near the upper end thereof, a horizontally-extending tubular distributor head secured to the inner end of said pipe in fluid communication therewith, said head having therein a plurality of horizontally-spaced ports providing fluid passages between said head and the interior of said tank; means manually operable at will from outside said tank for rotating said head about its horizontal axis, thereby to adjust the angularity of said ports with respect to the horizontal; means for supplying fluids to said pipe, and means for rotating said pipe, thereby to rotate said head within said tank.

2. Structure recited in claim 1, wherein said distributor head comprises a plurality of branch tubes which extend horizontally outwardly in different directions from said feed pipe, each of said branch tubes having therein a plurality of horizontally-spaced ports; and wherein said manually operable means comprises common means for rotating all of said branch tubes, each about its own horizontal axis.

3. Structure according to claim 1, including also means for moving said pipe vertically, thereby to adjust the vertical position of said head with respect to said tank.

4. Structure recited in claim 1, wherein said pipe rotating means comprises a driving motor with an output shaft, and means drivingly connecting said shaft to said pipe for rotation of said pipe by said shaft; said structure including also a motor with an output shaft, and motion transmitting means intercoupling said last-mentioned shaft and said pipe for linear longitudinal movement of said pipe by said last-mentioned shaft.

5. Structure of claim 4, wherein said distributor head comprises a plurality of branch tubes which extend horizontally outwardly in different directions from said feed pipe, each of said branch tubes having therein a plurality of horizontally-spaced ports; and wherein said manually operable means comprises common means for rotating all of said branch tubes, each about its own horizontal axis.